United States Patent [19]

Döge et al.

[11] 4,017,206
[45] Apr. 12, 1977

[54] WINNOWING BLOWER FOR COMBINE HARVESTER-THRESHER

[75] Inventors: Klaus Döge, Dresden; Gerd Manig, Nassebohla; Wolfgang Hentsch, Grosspostwitz; Johannes Mucke, Singwitz, all of Germany

[73] Assignee: VEB Kombinat Fortschritt Landmaschinen, Neustadt in Sachsen, Germany

[22] Filed: Sept. 3, 1975

[21] Appl. No.: 610,083

[52] U.S. Cl. .................. 415/102; 130/24; 98/36; 415/148; 415/209; 56/14.6

[51] Int. Cl.² .............. F01D 3/02; A01F 7/00

[58] Field of Search .......... 415/60, 66, 68, 90, 415/94, 98, 99, 101, 102, 206, 207; 416/182, 184, 185, 189; 56/14.6; 130/24

[56] References Cited

UNITED STATES PATENTS

| 482,846 | 9/1892 | Landis | 415/99 |
|---|---|---|---|
| 2,254,127 | 8/1941 | Underwood | 416/184 |
| 3,034,702 | 5/1962 | Larsson et al. | 415/209 |
| 3,109,433 | 11/1963 | Claas | 130/24 |
| 3,145,641 | 8/1964 | Morrison | 415/206 |
| 3,223,313 | 12/1965 | Kinsworthy | 415/206 |
| 3,469,773 | 9/1969 | Pool et al. | 415/207 |

FOREIGN PATENTS OR APPLICATIONS

| 37,279 | 11/1930 | France | 415/141 |
|---|---|---|---|
| 1,807,874 | 10/1969 | Germany | 415/102 |

*Primary Examiner*—C. J. Husar
*Attorney, Agent, or Firm*—Karl F. Ross; Herbert Dubno

[57] ABSTRACT

A winnowing blower for discharging a stream of air over the sieve of a combine harvester-thresher has an axially elongated housing formed at each of its axial ends with an inlet opening provided with an axial-flow fan. A shaft passing axially through the housing carries these two fans and two deflector disks spaced inwardly from the fans and each of a diameter substantially less than the respective fan. The housing is provided with a radially extending plenum chamber so that air drawn axially into the ends of the housing is partially deflected by these plates and ejected outwardly through the plenum chamber over the sieve of the combine.

5 Claims, 3 Drawing Figures

WINNOWING BLOWER FOR COMBINE HARVESTER-THRESHER

FIELD OF THE INVENTION

The present invention relates to a combine harvester-thresher.

More particularly this invention concerns a winnowing blower for discharging a stream of air over the sieve of such a combine.

BACKGROUND OF THE INVENTION

In a combine harvester-thresher the grain being harvested is threshed and then fed to shaking screens above grain and chaffer sieves. A winnowing blower directs a strong current of air horizontally across these two sieves and thereby separates the chaff from the heavier grain. In this manner virtually all of the grain is recovered from the crop and the stalks are left behind the combine in a neat windrow. Such a combine harvester-thresher is described on pages 432 ff. of THE WAY THINGS WORK (Simon & Schuster: 1967) and U.S. Pat. No. 3,566,880.

The winnowing blower of such a combine typically comprises an axially elongated housing having at one or both of its ends a suction fan and provided with a plenum passage extending the full axial length of the housing and opening radially therefrom. The fans draw air in through the inlets at the ends of the housing and create a high-pressure zone within the housing. This air is forced out of the plenum passage and over the sieves. Since the combine is a relatively wide machine, the chaffer and grain sieves are also relatively wide. Thus the current of air passed over them to winnow the grain must be of approximately the same strength across the full width of the machine. In the typical system the pressure near the ends of the blower, that is to the lateral side of the combine, is substantially less than at the center.

It has been suggested to even out this air stream by providing at the outlet end of the plenum passage a perforated plate having substantially larger holes toward the sides than at the center. Such an arrangement not only considerably reduces the efficiency of the blower, but is also subject to clogging. Thus it is necessary in such an arrangement to provide an oversized blower to compensate for the decreased efficiency and periodically to open the blower up and clean the distribution plate.

In another arrangement it has been sugggested to provide several distribution tubes within the housing of the blower. These tubes are formed basically as elbows having one end opening adjacent a respective fan and another end in the plenum at a position determined by the desired distribution. Such arrangements are relatively complicated and must be engineered with great precision in order to obtain the desired even effect.

It is also known to provide the fan completely externally of the blower housing and to use a complicated conduit arrangement with a manifold at the housing in order to insure even air distribution therein. Such an arrangement is relatively bulky and extremely complex, considerably raising te cost of the combine.

This air-distribution problem is worsened in the average combine where the amount of crop delivered to the sides of the shaking screen and, therefore, to the sides of the grain and chaffer sieves is greater than at the middle. On the contrary an average blower delivers a greater quantity of air to the middle than toward the end so that valuable grain is lost through ineffective winnowing or excessive amounts of chaff are present in the grain.

OBJECTS OF THE INVENTION

It is therefore an object of the present invention to provide an improved combine harvester-thresher.

Another object is the provision of an improved winnowing blower for such a combine.

yet another object is to provide such a winnowing blower which is simple in construction and which produces a uniform stream of air along its full length.

SUMMARY OF THE INVENTION

These objects are attained according to the present invention in a winnowing blower of the above-described general type but wherein at least one transversely extending deflection plate is provided in the housing between the fans. Two such plates may be provided each spaced from a respective one of the fans and affixed either to a shaft carrying the fans or to the housing so as to be axially nondisplaceable within the housing.

According to this invention these deflection plates are simple flat metal disks secured to the shaft carrying the fan and extending perpendicular to the axis defined by the shaft. These disks have an outer diameter which is substantially smaller than the outer diameter of the fans and substantially greater than the outer diameter of the hubs of the fans. In addition these disks are spaced inwardly from their respective fans by a distnace equal to between one fifth and one third of the overall axial length of the housing.

With the system according to the present invention a uniform stream of air is produced at the output end of the plenum passage connected to the blower housing. The system is extremely simple and inexpensive to manufacture and is not subject to fouling or clogging. Even adjacent the lateral edges of the blower a heavy stream of air is produced which serves completely to winnow the grain on the respective portion of the sieves. In addition a very even flow of air with virtually no turbulence is produced by this system, since the hitherto known flow aids almost invariably produced a certain amount of turbulence that had a deleterious effect on the winnowing. Furthermore since the winnowing blower is entirely self-contained it adds virtually no extra width to the combine so that this machine can be dimensioned to a width equal to the maximum width allowed on the highways and can be used to cut a swath of substantially the same width.

BRIEF DESCRIPTION OF THE DRAWING

The above and other objects, features, and advantages of the invention will become more readily apparent from the following description, reference being made to the accompanying drawing in which.

SPECFIC DESCRIPTION

Figure 1:
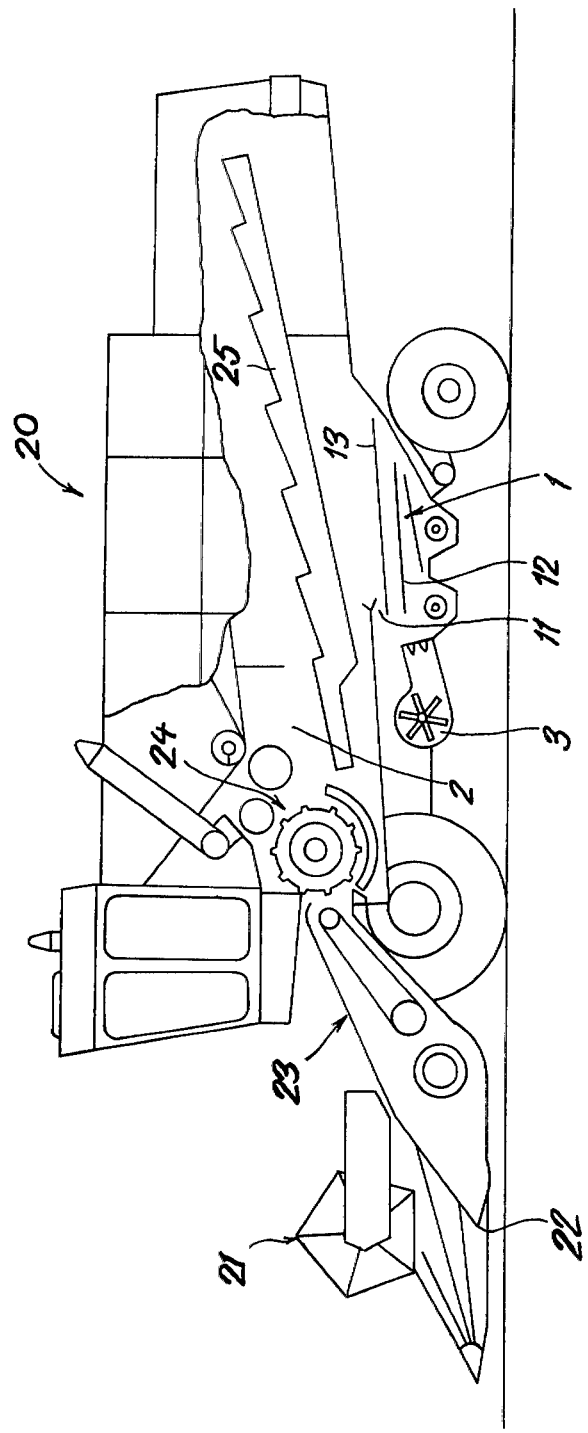
FIG. 1 is a diagrammatic side view partly in section of a combine harvester-thresher according to this invention.

As shown in FIG. 1 a combine 20 of conventional construction has a revolving reel 21 situated above a cutter bar 22 carried on a feed arrangement 23 which feeds cut grain through a thresher 24 and thence on to a shaking screen 25. Below the shaking screen 25 are a grain sieve 12 and chaffer sieve 13, with the grain to be winnowed dropping on to these sieves 12 and 13 from the screen 25 and over a step 11.

Figure 2:
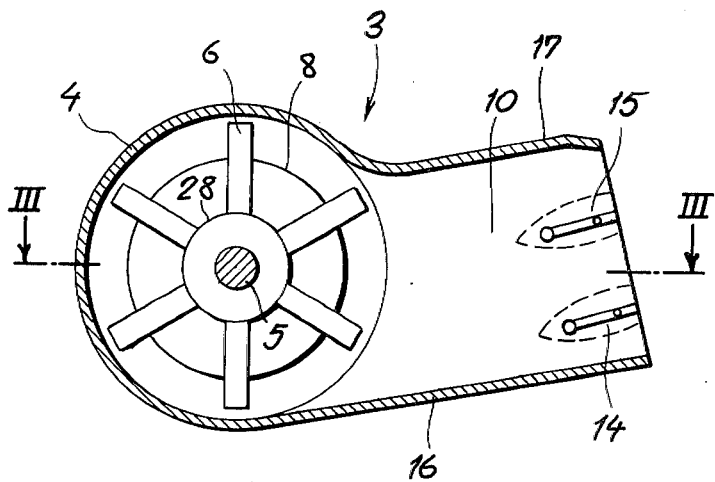
FIG. 2 is a vertical section taken through a blower according to this invention.
Figure 3:
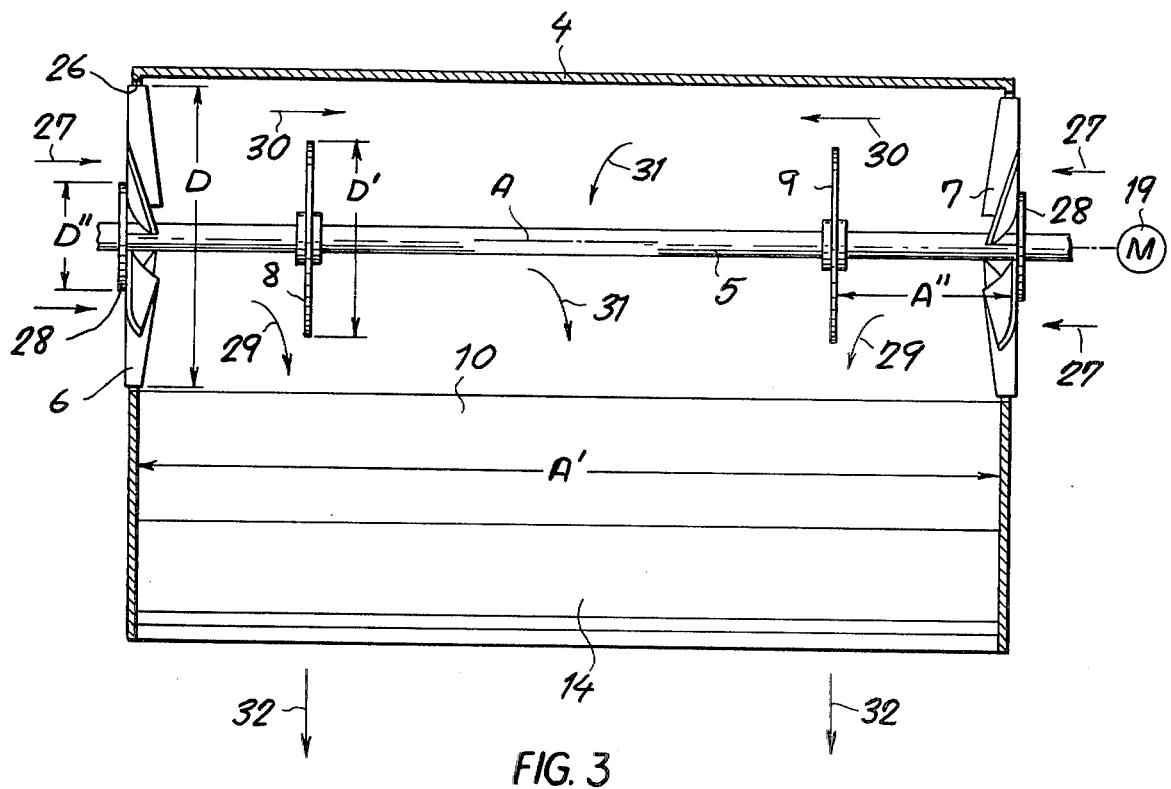
FIG. 3 is a section taken along line III—III of FIG. 2.

A blower 3 is provided on this combine for directing a current of air over the sieves 12 and 13. This blower 3 is shown in more detail in FIGS. 2 and 3 and is seen basically to comprise a cylindrical housing 4 having its opposite ends inlet openings 26 of circular shape and provided with a radially extending plenum chamber 10 having a bottom wall 16 and top wall 17. The housing 4 is centered on an axis A along which lies a shaft 5 carrying a pair of axial-flow fans 6 and 7 each situated in a respective inlet opening 26. A motor 19 rotates this shaft 5 and the fans 6 and 7 about the axis A so as to draw air into the housing as indicated by arrows 27.

Mounted on the shaft 5 are two disks 8 and 9 of circular shape and made of sheet steel. The openings 26 have an inside diameter D, and the disks have an outside diameter D' equal to between one-half and two-thirds of the diameter D, here equal to 0.65D. In addition each of the fans 6 and 7 has a hub 28 of an outside diameter D'' equal to between one-third and two-thirds of the diameter D', here equal to 0.5D'. In addition the housing 4 has an overall axial length A' and each of the plates 8 and 9 is spaced from its respective fans 6 and 7 by a distance A'' equal to between one-fifth and one-third of the distance A', here equal to slightly more than one-fifth.

After being drawn into the housing in the direction of arrows 27 some of the air is deflected by the plates 8 and 9 as indicated by arrows 30 into the space between the plates 8 and 9. Thereafter the air moving in the direction of arrows 30 moves radially outwardly as indicated by arrows 31 and ultimately exits from the plenum 10 in the direction of arrows 32. Vanes 14 and 15 pivotal about axes parallel to the axis A and extending parallel to this axis A are provided at the outlet side of the plenum 10 to direct the air flow appropriately over the sieves 12 and 13.

We claim:

1. A winnowing blower for discharging a stream of air over the sieve of a combine harvester-thresher, said blower comprising:
   an axially elongated housing having axial ends each formed with an inlet and a side formed with an outlet extending the full axial length of said housing;
   a plenum passage extending radially from said housing at said outlet and directed at said sieve;
   an axial-flow fan at each of said inlets;
   means for rotating said fans and drawing air into said housing through said inlets; and
   at least one transversely extending inperforate deflection plate in said housing between said fans, said plate being a disk mounted along the axis of said fans and having an axial spacing from one of said fans which is about one fifth to one-third of the axial distance between them, said disk having a diameter of about one-third to two-thirds the diameter of said one of said fans.

2. A winnowing blower for discharging a stream of air over the sieve of a combine harvester-thresher, said blower comprising:
   an axially elongated housing having axial ends each formed with an inlet and a side formed with an outlet extending the full axial length of said housing;
   a plenum passage extending radially from said housing at said outlet and directed at said sieve;
   an axial-flow fan at each of said inlets;
   means for rotating said fans and drawing air into said housing through said inlets; and
   at least one transversely extending imperforate deflection plate in said housing between said fans, rotating means including a shaft carrying said fans and extending axially through said housing between said ends, a pair of such plates being axially spaced upon and carried on shaft,
   said fans having hubs and said plates having a diameter greater than the diameter of said fans at said hubs and smaller than the outside diameter of said fans.

3. The blower defined in claim 2 wherein said plates are each spaced from the respective end by a distance equal to between one-fifth and one-third the overall axial length of said housing between said ends.

4. The blower defined in claim 3 wherein said plenum passage is provided with vanes parallel to said axis for directing air over said sieves.

5. The blower defined in claim 3 wherein said plates are circular disks secured on said shaft.

* * * * *